US008136696B2

(12) United States Patent
Cheng et al.

(10) Patent No.: US 8,136,696 B2
(45) **Date of Patent: *Mar. 20, 2012**

(54) LOTTERY TICKET MACHINE ABLE TO PREVENT TICKETS FROM BEING ILLEGALLY DRAWN OUT

(76) Inventors: Yun-Lan Cheng, Tainan (TW); Hui-Jin Tong, Tainan (TW)

(*) Notice: Subject to any disclaimer, the term of this patent is extended or adjusted under 35 U.S.C. 154(b) by 453 days.

This patent is subject to a terminal disclaimer.

(21) Appl. No.: 12/435,403

(22) Filed: May 4, 2009

(65) Prior Publication Data

US 2010/0276440 A1 Nov. 4, 2010

(51) Int. Cl.
*B65G 59/00* (2006.01)
*B65H 3/00* (2006.01)
*G07F 11/00* (2006.01)

(52) U.S. Cl. ............ 221/151; 221/7; 221/277; 221/255; 221/152; 221/153; 221/258; 399/167

(58) Field of Classification Search .............. 225/4, 151; 221/151, 7, 277, 255, 152, 153, 258; 399/167
See application file for complete search history.

(56) References Cited

U.S. PATENT DOCUMENTS

| | | | | |
|---|---|---|---|---|
| 5,803,308 | A * | 9/1998 | Rong | 221/7 |
| 6,036,052 | A * | 3/2000 | Tong | 221/259 |
| 6,053,358 | A * | 4/2000 | Tong | 221/151 |
| 6,752,289 | B1 * | 6/2004 | Lin | 221/30 |
| 7,450,886 | B2 * | 11/2008 | Ahn et al. | 399/167 |
| 2002/0117528 | A1 * | 8/2002 | Turek | 225/4 |
| 2005/0130794 | A1 * | 6/2005 | Jinbo | 475/331 |
| 2006/0081674 | A1 * | 4/2006 | Roberts et al. | 225/2 |
| 2009/0159610 | A1 * | 6/2009 | Woods et al. | 221/45 |

* cited by examiner

*Primary Examiner* — Gene O. Crawford
*Assistant Examiner* — Rakesh Kumar

(57) ABSTRACT

A lottery ticket machine able to prevent tickets from being illegally drawn out includes a machine base provided with a driving device, two press rollers with pressed streaks on the wheel surface and a control device. One of the two press rollers is provided with a shaft extending out of the machine base for fixing the control device that contains a rotary gear with engage holes, a bushing and a control wheel bored with bushing hole to be fitted with the bushing and disposed with engage teeth and projecting members to be respectively engaged with the engage holes of the rotary gear. An outer cover covered on the control device is provided inside with engage teeth to correspondingly engage with the engage teeth of the control wheel, and a spring has opposite ends respectively pushing against the control wheel and the inner wall of the bushing cover.

9 Claims, 11 Drawing Sheets

LOTTERY TICKET MACHINE ABLE TO PREVENT TICKETS FROM BEING ILLEGALLY DRAWN OUT

BACKGROUND OF THE INVENTION

This invention relates to a lottery ticket machine able to prevent tickets from being illegally drawn out, particularly to one including a machine base assembled thereon with a driving device, two press rollers and a control device. One of the two press rollers is provided with a shaft extending out of the machine base for fixing the control device thereon, and both of the two press rollers have their wheel surfaces respectively disposed with pressed streaks. The control device orderly consists of a rotary gear, a bushing, a control wheel, a spring, a bushing cover, a retainer and an outer cover. The rotary gear is bored with a plurality of engage holes, and the control wheel has its outer side annularly provided with lots of engage teeth and its rear side secured thereon with a plurality of projecting members to be respectively engaged with the engage holes of the rotary gear. The outer cover covered on the control device is disposed with lots of engage teeth inside to be correspondingly engaged with the engage teeth of the control wheel. When the lottery tickets are pulled by external force, the control wheel fitted with the combining member of the shaft by the bushing will be actuated to rotate and disengaged from the rotary gear to have its engage teeth firmly engaged with the engage teeth of the outer cover. Thus, the press rollers can never be rotated at all, and the lottery ticket has its topside and underside tightly pressed by the pressed streaks on the wheel surfaces of the press rollers and hence impossible to be drawn out by force, able to prevent the lottery tickets from being stolen.

DESCRIPTION OF THE PRIOR ART

A conventional lottery ticket machine, as disclosed in a Taiwan patent No. 352845, titled "LOTTERY TICKET MACHINE ABLE TO PREVENT TICKET FROM BEING DRAWN OUT", includes a machine base having a front side plate bored with threaded holes, and a rear side plate bored with a through hole and disposed with a micro-switch, stoppers and slide rails at the inner side, with connecting rods fixed between the two side plates to combine them together. A press device is set on the slide rails of the side plate of the machine base, having its front upper side provided with a control plate. A faceplate is fixed at the front end of the machine base and has its front side disposed with a ticket outlet having its upper side formed with a blocking surface and its lower side provided with a guide plate. The ticket outlet has its topside and its underside respectively secured with a positioning block, and its right and left side respectively provided with a pivotal lug with a threaded hole. An elastic member has opposite ends respectively hooked with the machine base and the rear side of the press device. Structured in this way, when drawn out illegally by an external force, the lottery ticket will actuate the press device to shift forward on the slide rails to resist against the rear side of the faceplate. At this time, the electromagnetic valve of the machine base will be in an OFF condition, and the control plate of the press device will be stopped by the blocking surface of the faceplate to tightly resist against the guide plate and firmly clamp the lottery ticket so as to prevent the lottery ticket from being drawn out by a great force, thus surely avoiding the lottery tickets being stolen.

However, after used for a long time, the control plate of the press device is likely to produce elastic fatigue and unable to tightly resist the lottery ticket and therefore it is impossible to prevent the lottery ticket from being drawn out illegally by an external force.

SUMMARY OF THE INVENTION

The objective of this invention is to offer a lottery ticket machine able to prevent tickets from being illegally drawn out.

The feature of this invention is that one of two press rollers is fixed with a shaft extending out of a machine base in the same direction of two pivots of the machine base. The shaft has its outer side provided with a combining member and an annular engage groove. A control device is fitted on the shaft of one of the two press rollers, composed of a rotary gear, a bushing, a control wheel, a spring, a bushing cover, a retainer and an outer cover. The rotary gear is fitted around the shaft of one of the two press rollers, driven to rotate by a driven gear of a driving device and bored with more than one engage hole. The bushing is fitted on the combining member of the shaft of the press roller, having its outer side secured thereon with a plurality of projecting ridges. The control wheel fitted on the bushing is bored with a bushing hole with a shape the same as the bushing, and has its outer side annularly provided with plural engage teeth having their inner circumference receiving a spring therein and its rear side fixed thereon with more than one projecting member to be correspondingly engaged with the engage hole of the rotary gear. The bushing cover is mounted on the bushing, having its center bored with a bushing hole having the same shape as the bushing. The spring has another end pushing against the inner wall of the bushing cover. The retainer is clasped in the annular engage groove at the outer end of the shaft of the press roller for positioning the control device on the shaft. The outer cover is threadably combined with a side plate of the machine base for covering both the driving device and the control device, disposed inside with a recess annularly fixed thereon with lots of engage teeth to correspondingly engage with the engage teeth of the control wheel.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
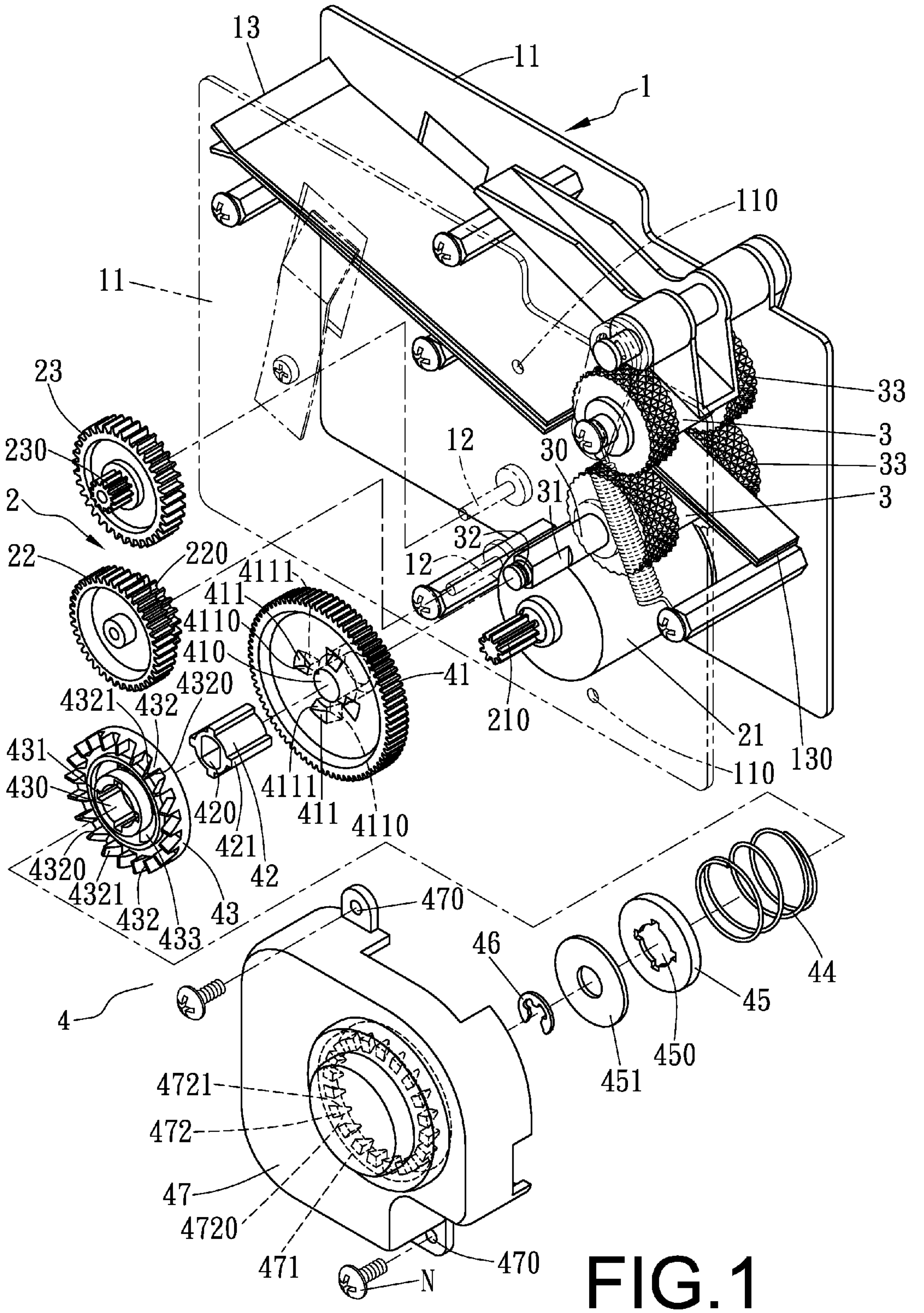
FIG. 1 is an exploded perspective view of a lottery ticket machine in the present invention.
Figure 2:
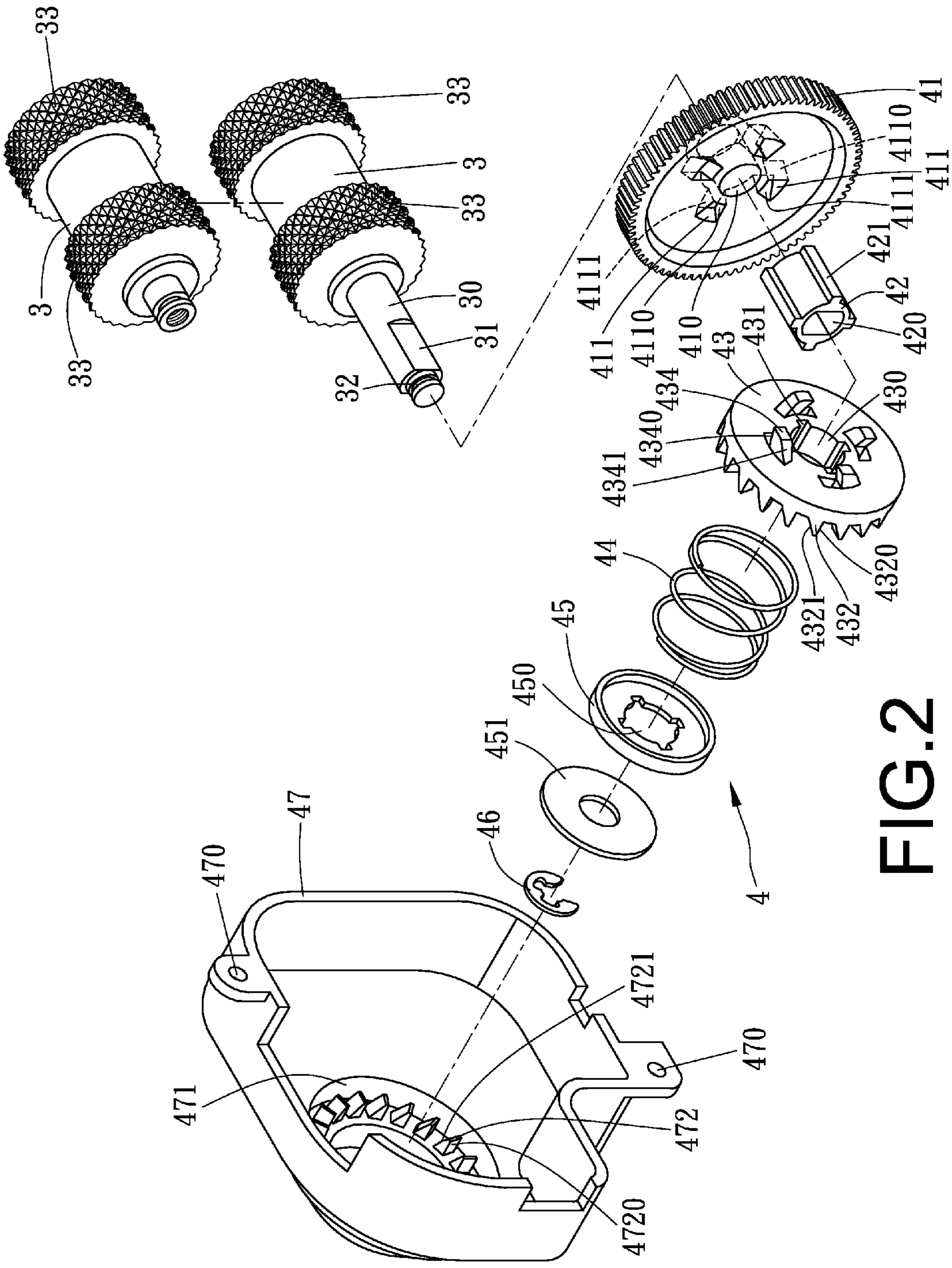
FIG. 2 is an exploded perspective view of a control device of the lottery ticket machine in the present invention.
Figure 3:
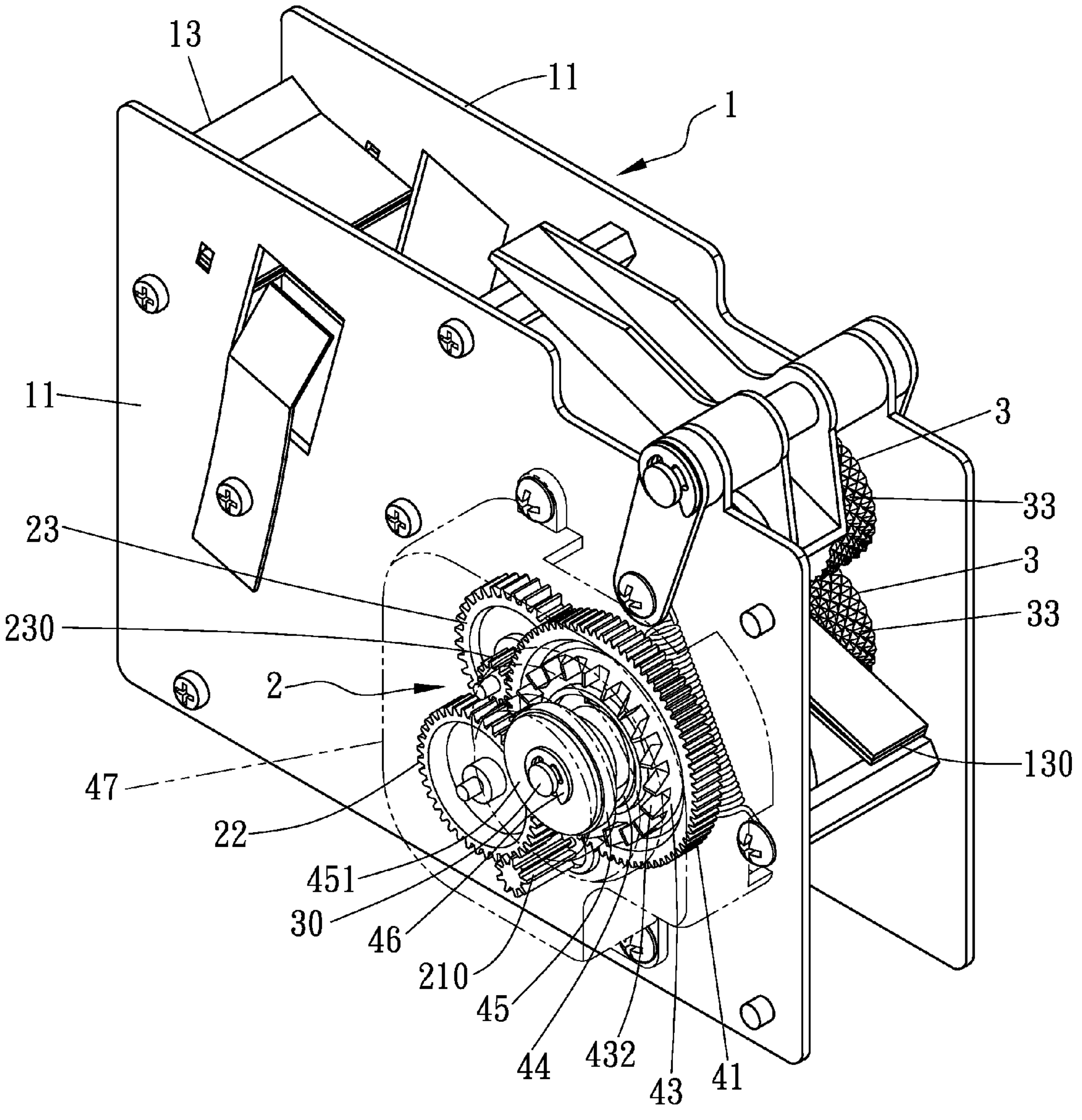
FIG. 3 is a perspective view of the lottery ticket machine in the present invention.

A preferred embodiment of a lottery ticket machine able to prevent tickets from being illegally drawn out in the present invention, as shown in FIGS. 1, 2 and 3, includes a machine base 1, a driving device 2, two press rollers 3 and a control device 4 as main components combined together.

The machine base 1 is provided with two side plates 11 respectively bored with plural threaded holes 110, and one of the two side plates 11 has its outer side fixed thereon with two pivots 12. The machine base 1 has its interior disposed with a lottery ticket circular passageway 13 formed with a ticket outlet 130 at the outer end.

The driving device 2 assembled inside the machine base 1 is composed of a motor 21, a driving gear 22 and a driven gear 23. The motor 21 is provided with a geared shaft 210 extending out of the side plate 11 at the same side of the two pivots 12. The driving gear 22 is pivotally fitted around one pivot 12 of the machine base 1 and engaged with the geared shaft 210 of the motor 21 to be driven to rotate by the geared shaft 210, having its rear side secured with a driving pinion 220. The driven gear 23 is pivotally assembled on the other pivot 12 of the machine base 1 and engaged with the driving pinion 220 of the driving gear 22, having its front side fixed thereon with a driven pinion 230.

The two press rollers 3 are positioned in the interior of the machine base 1, and the final part of the lottery ticket circular passageway 13, close to the ticket outlet 130, is extended forward between the two press rollers 3 so that the opposite sides of a lottery ticket (T) can be rolled and pressed by the two press rollers 3. One of the two press rollers 3 is fixed with a shaft 30 extending out of one side plate 11 at the same side of the pivot 12 of the machine base 1. The shaft 30 has its outer circumferential side disposed with a combining member 31 and an annular engage groove 32. Further, the two press rollers 3 have their wheel surfaces respectively formed with rhombic pressed streaks 33.

The control device 4 fitted on the shaft 30 of one of the two press rollers 3 consists of a rotary gear 41, a bushing 42, a control wheel 43, a spring 44, a bushing cover 45, a retainer 46 and an outer cover 47. The rotary gear 41 is fitted on the shaft 30 of the press roller 3 and engaged with the driven pinion 230 of the driven gear 23 of the driving device 2, bored with a shaft hole 410 in the center and plural engage holes 411 respectively having its inner wall provided with a slope 4110 at one side along a circumferential direction and formed with a parabolic arcuate surface 4111 at another side. The bushing 42 is combined with the combining member 31 at the outer side of the shaft 30 of one of the two press rollers 3 and leans on the outer side of the rotary gear 41, bored with a through hole 420 with the same shape as the combining member 31 of the shaft 30 and having its outer side disposed thereon with a plurality of lengthwise projecting ridges 421. The control wheel 43 fitted on the bushing 42 is bored in the center with a bushing hole 430 having the same shape as the bushing 42 and having its inner wall provided with lengthwise positioning slide grooves 431 to be respectively engaged with the projecting ridges 421 on the bushing 42 so as to enable the control wheel 43 to slide on the bushing 42. Further, the control wheel 43 has one side annularly provided with a plurality of engage teeth 432 respectively having one side formed with an engage surface 4320 and another side disposed with a slope 4321, and the bushing hole 430 of the control wheel 43 has its outer circumference bored with a spring groove 433 for receiving the spring 44 therein. Furthermore, the control wheel 43 has its rear side fixed thereon with plural projecting members 434 to be respectively engaged with the engage holes 411 of the rotary gear 41, and each projecting member 434 has its opposite sides respectively formed with a slope 4340 and an arcuate surface 4341 respectively corresponding with the slope 4110 and the arcuate surface 4111 of the engage hole 411 of the rotary gear 41. The bushing cover 45 fitted on the bushing 42 is bored in the center with a bushing hole 450 having the same shape as the bushing 42, with one end of the spring 44 pushing against the inner wall of the bushing cover 45 and a gasket 451 mounted at the front side of the bushing cover 45. The retainer 46 is clasped in the annular engage groove 32 at the outer end of the shaft 30 of the press roller 3 for firmly positioning the control device 4 on the shaft 30. The outer cover 47 is threadably assembled on the side plate 11 of the machine base 1 to cover up both the driving device 2 and the control device 4, bored with plural threaded holes 470 respectively corresponding with the threaded holes 110 of the side plate 11 of the machine base 1, with bolts (N) respectively screwed in the threaded holes 470 and 110 to combine the outer cover 47 together with the side plate 11 of the machine base 1. The outer cover 47 has its inner side provided with an annular recess 471 annularly fixed therein with plural engage teeth 472 to be correspondingly engaged with the engage teeth 432 of the control wheel 43, with each engage tooth 472 having one side formed with an engage surface 4720 and another side formed with a slope 4721.

Figure 4:
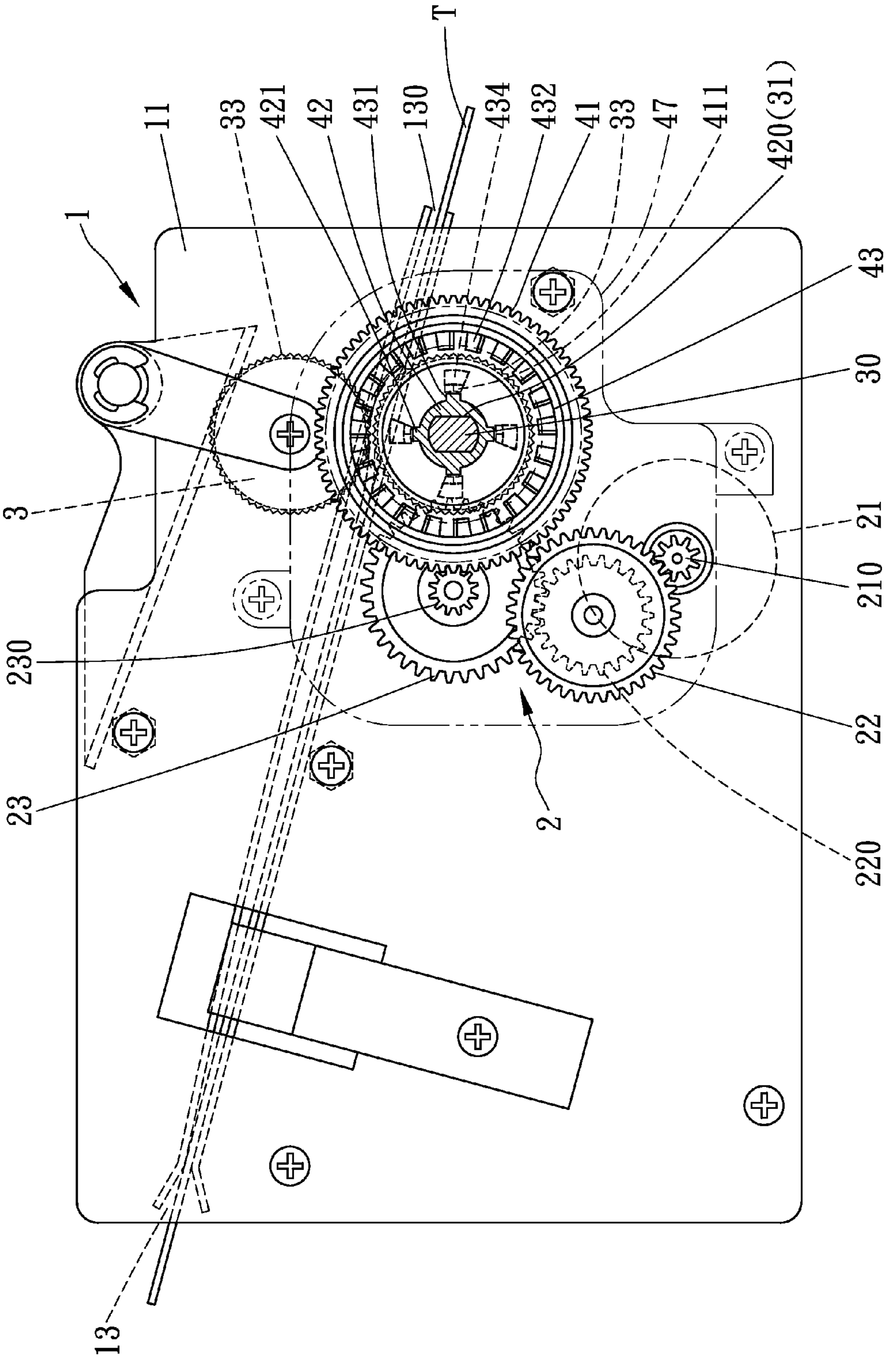
FIG. 4 is a side view of the lottery ticket machine in the present invention.
Figure 5:
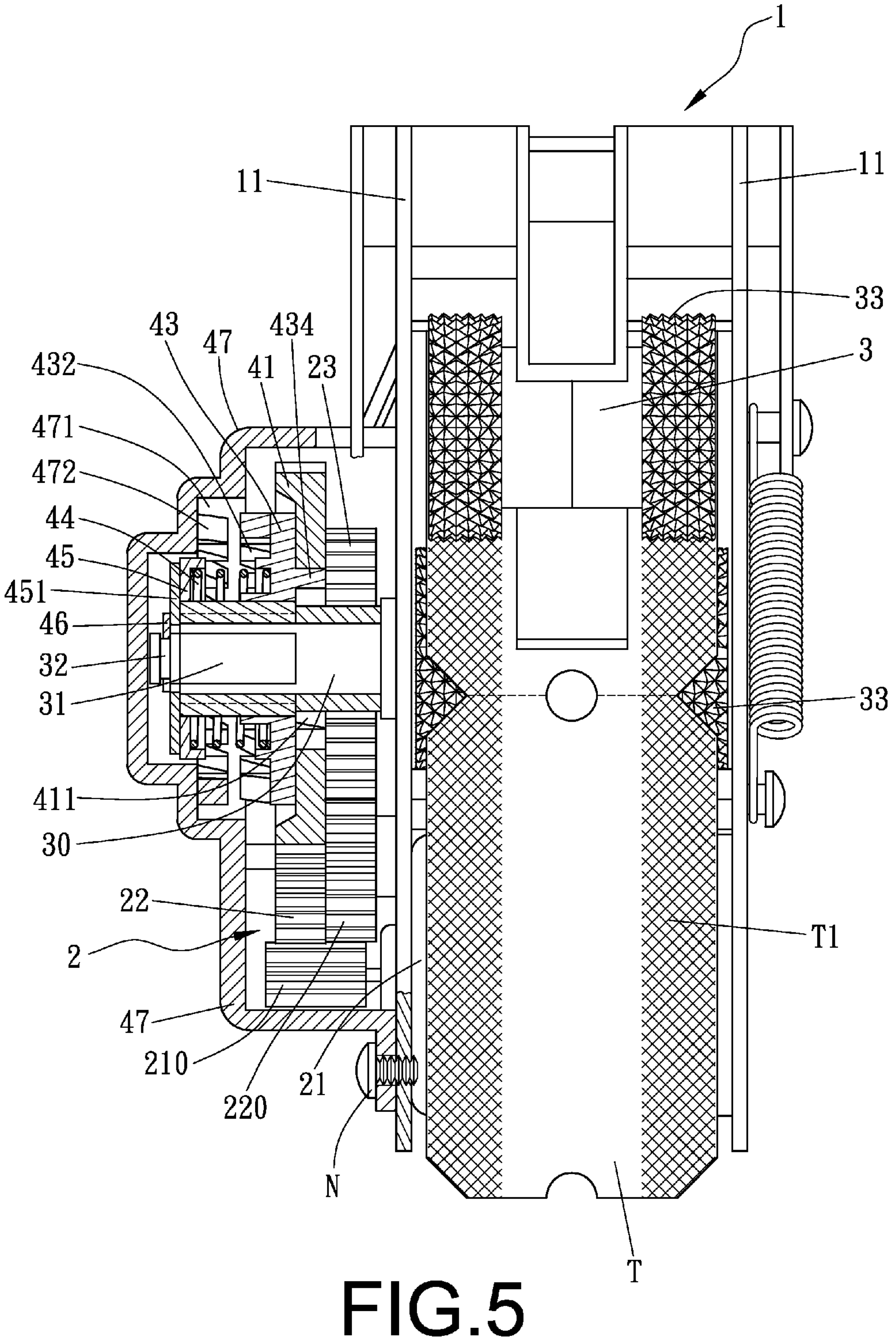
FIG. 5 is a cross-sectional view of the lottery ticket machine in an operating condition in the present invention.
Figure 6:
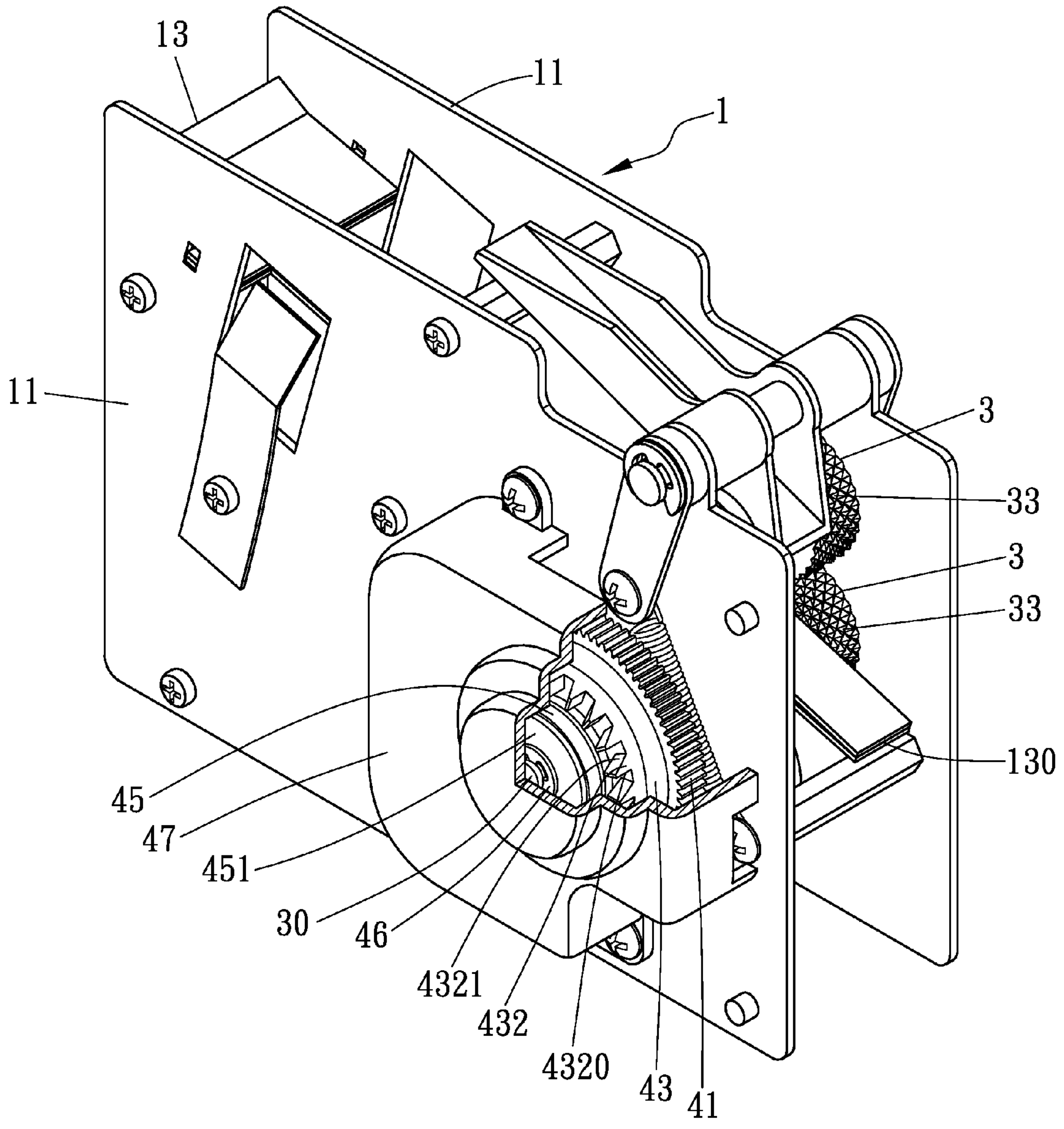
FIG. 6 is another perspective view of the lottery ticket machine in the present invention.
Figure 7:
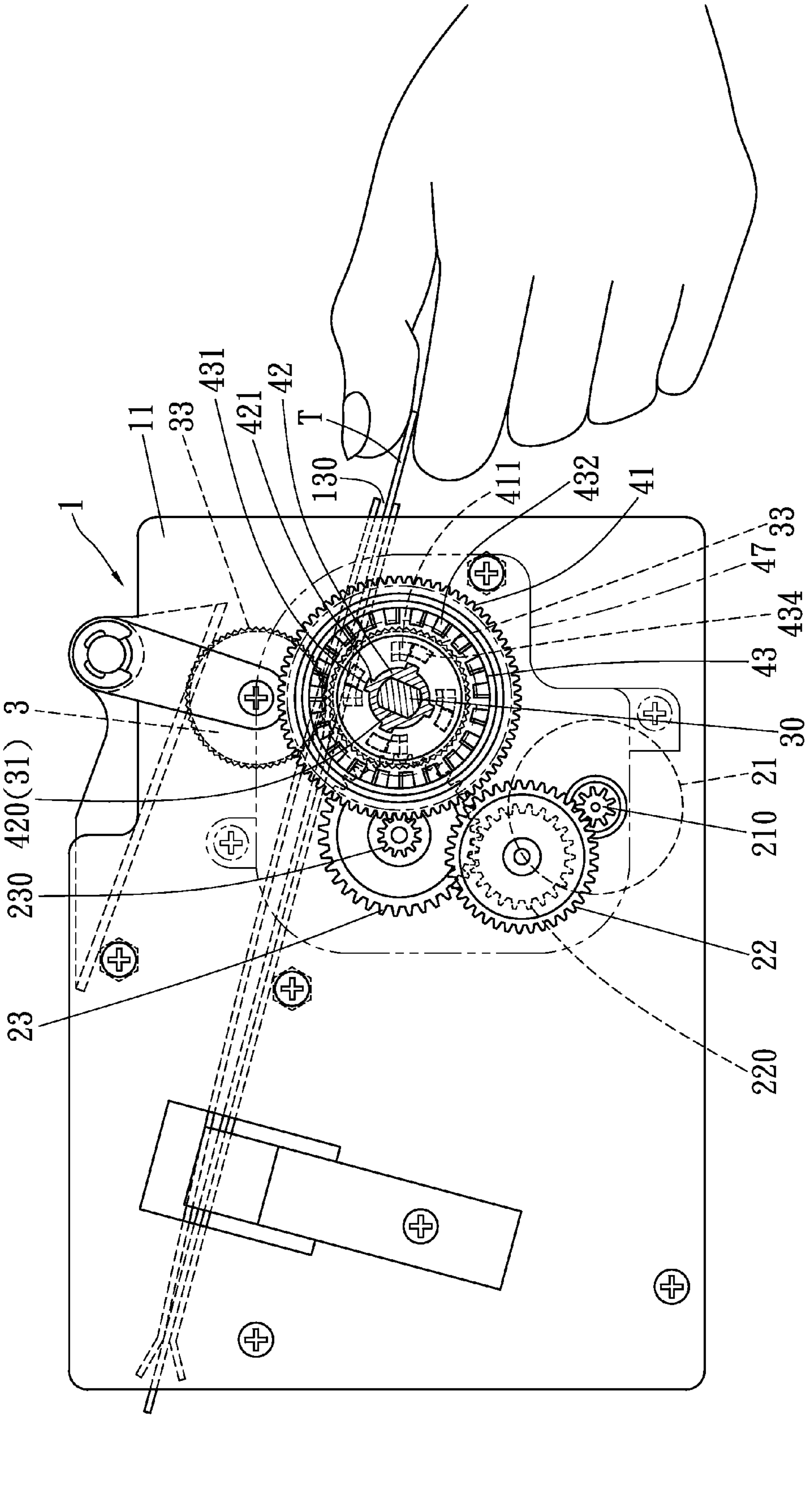
FIG. 7 is a side cross-sectional view of the lottery ticket machine in the present invention, showing that lottery tickets are being drawn out illegally by an external force.
Figure 8:
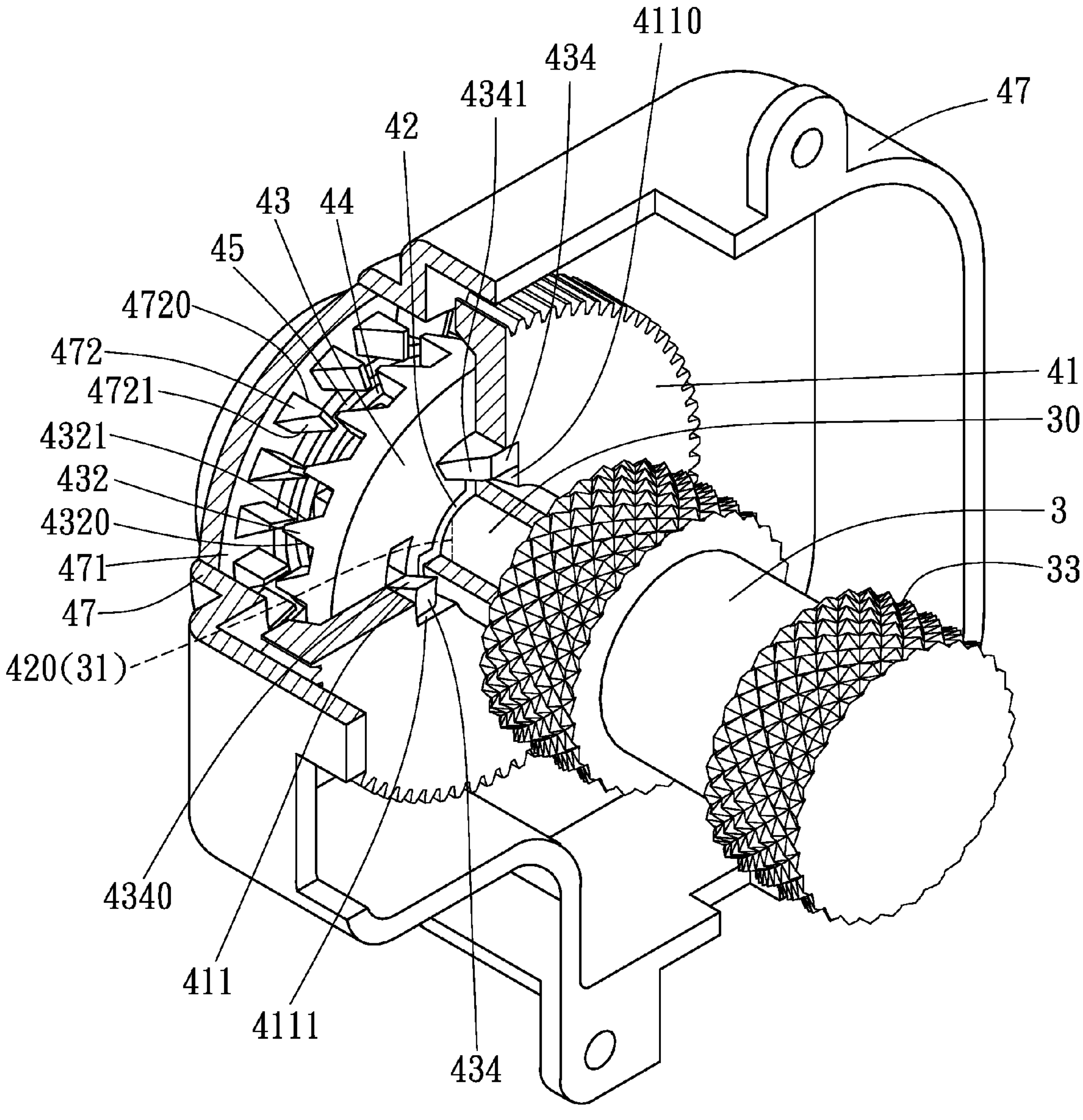
FIG. 8 is a perspective view of the control device operated to be engaged with an outer cover in the present invention.
Figure 9:
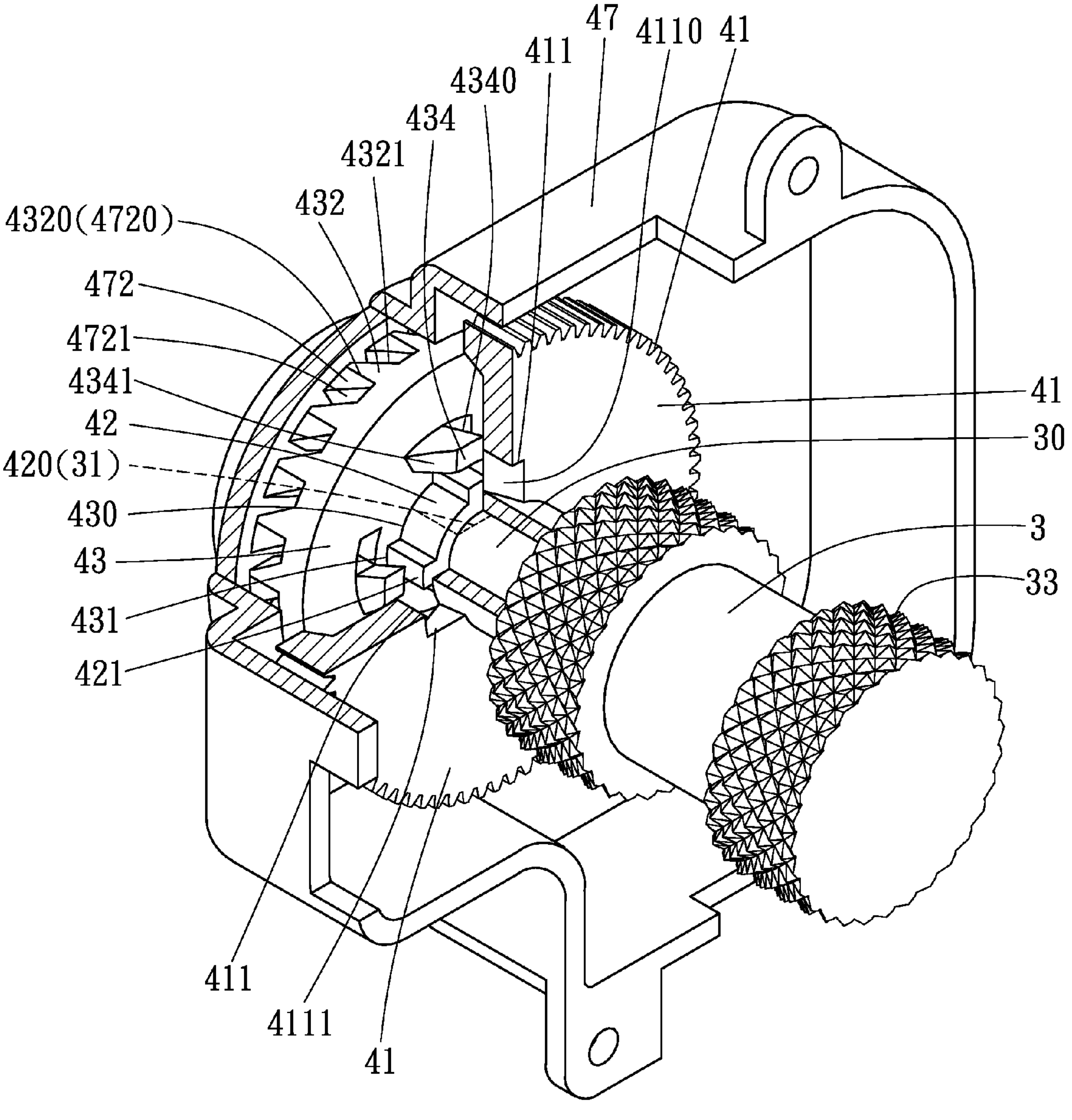
FIG. 9 is a perspective view of the control device engaged with the outer cover in the present invention.
Figure 10:
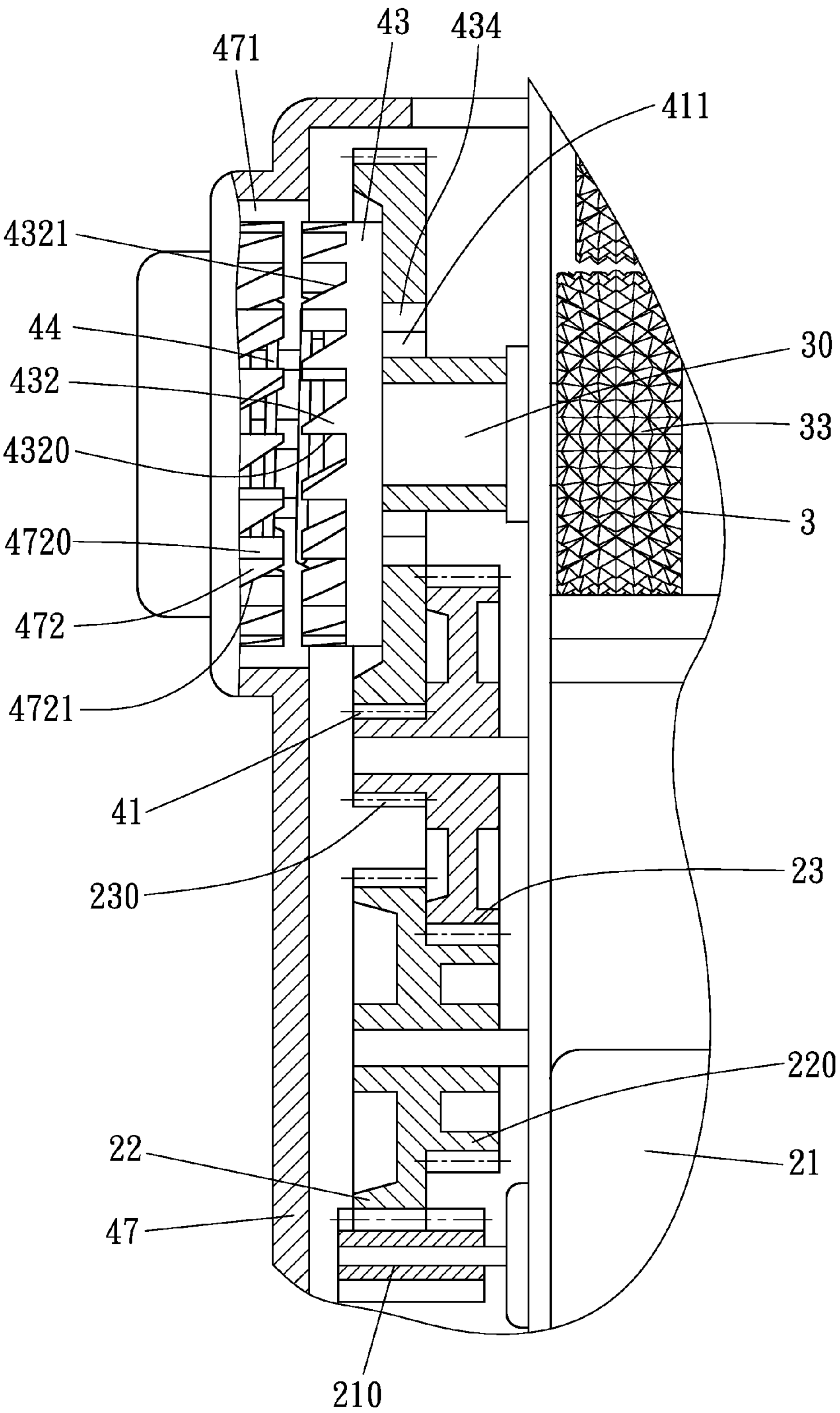
FIG. 10 is a cross-sectional view of the control device operated to be engaged with the outer cover in the present invention.
Figure 11:
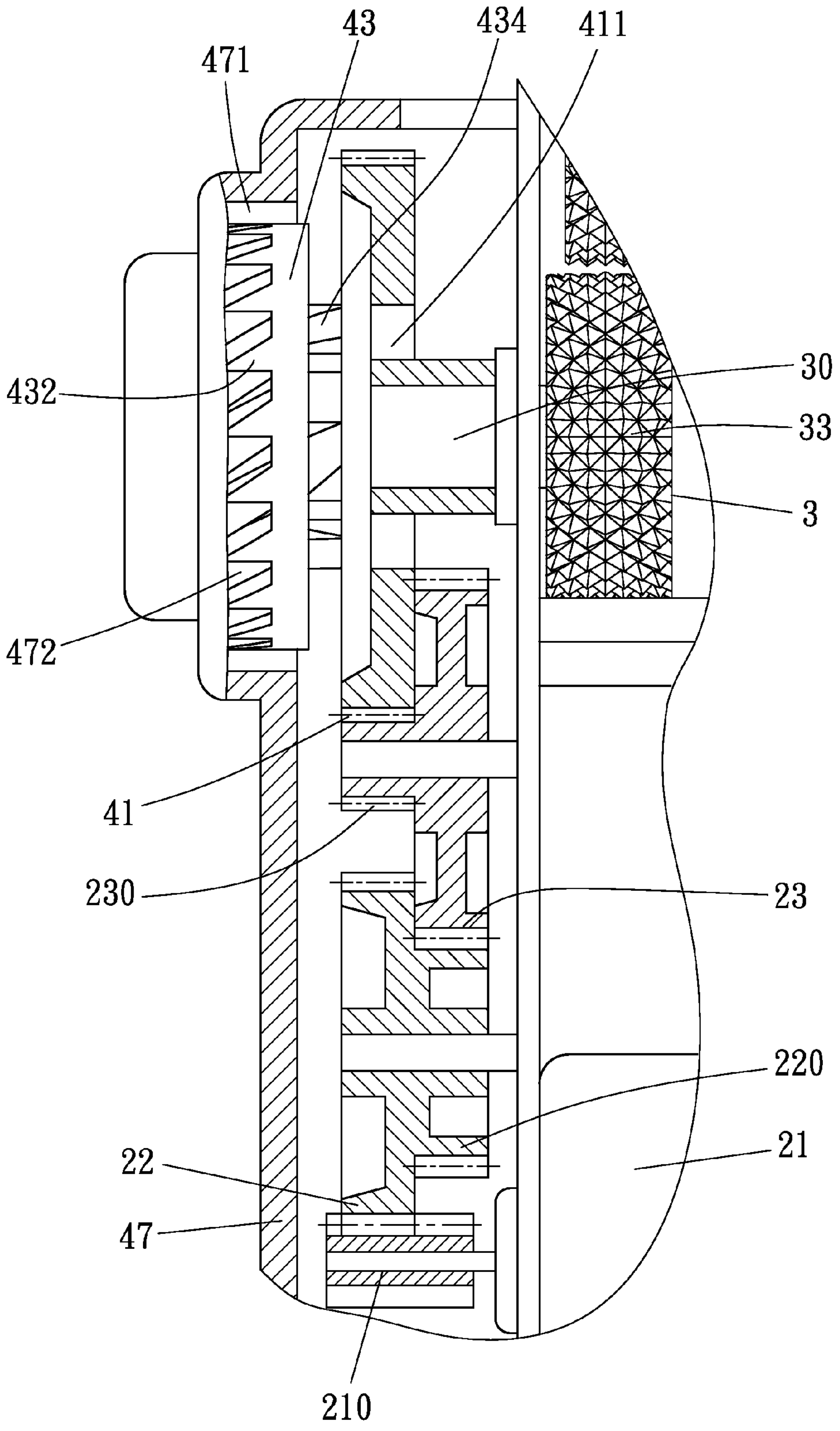
FIG. 11 is a cross-sectional view of the control device engaged with the outer cover in the present invention.

To roll and press lottery tickets (T), as shown in FIGS. 3, 4 and 5, start the motor 21 of the driving device 2 and the driving wheel 22 engaged with the geared shaft 210 of the motor 21 will be driven to rotate and have its driving pinion 220 driving the mutually engaged driven gear 23 to rotate and actuate both the rotary gear 41 engaged with the driven pinion 230 and the control wheel 43 combined with the rotary gear 41 to rotate together. Since the bushing hole 430 of the control wheel 43 is fixedly secured with the bushing 42 that is firmly combined with the combining member 31 of the shaft 30 of one of the two press rollers 3, therefore, when driven to rotate, the control wheel 43 will actuate the press rollers 3 to rotate. Thus, the press rollers 3 can press and roll the opposite sides of the lottery ticket (T) to form pressed streaks T1 thereon and smoothly send out the lottery ticket (T).

When the lottery tickets (T) sent out attains to a preset number of sheets (calculated according to starting time), a timing device will stop the motor 21 from operating. At this time, if a consumer wants to draw out more lottery tickets (T) illegally pulled by force, referring to FIGS. 6~11, the press rollers 3 and the shaft 30 will be actuated by the drawn lottery ticket (T) to rotate and drive the control wheel 43 to rotate. Since the control wheel 43 is firmly fitted on the combining member 31 of the shaft 30 by means of the bushing 42, therefore, when the control wheel 43 is actuated to rotate by the shaft 30, the rotary gear 41 will remain motionless. Simultaneously, the arcuate surfaces 4341 of the projecting member 434 at the rear side of the control wheel 43 will be actuated to slide away from the engage holes 411 of the rotary gear 41 along the arcuate surfaces 4111 of the engage holes 411 and shift forward to compress the spring 44 to force the engage teeth 432 of the control wheel 43 to be engaged with the engage teeth 472 in the recess 471 of the outer cover 47 when the control wheel 43 is rotated at most for one fourth of a circle. Thus, the press rollers 3 are impossible to be rotated, and the topside and the underside of the lottery ticket (T) will tightly be pressed by the pressed streaks 33 on the wheel surfaces of the two press rollers 3, letting the lottery ticket (T)

impossible to be drawn out illegally by force. Therefore, a consumer can only obtain the lottery tickets (T) that have already been rolled by the press rollers 3, surely achieving effect of preventing lottery tickets (T) from being stolen.

After the lottery ticket machine recovers to a normal operation condition and the motor 21 is started to drive the driving device 2 to rotate, the rotary gear 41 can be actuated to rotate. When the rotary gear 41 is rotated to have its engage holes 411 respectively aligned to the projecting members 434 of the control wheel 43, the projecting members 434 will be pushed by the spring 44 to respectively slide into the engage holes 411 to be engaged and positioned therein along the arcuate surfaces 4111 of the engage holes 411 of the rotary gear 41. Thus, the lottery tickets (T) can be rolled normally by the press rollers 3 and sent out smoothly.

While the preferred embodiment of the invention has been described above, it will be recognized and understood that various modifications may be made therein and the appended claims are intended to cover all such modifications that may fall within the spirit and scope of the invention.

What is claimed is:

1. A lottery ticket machine able to prevent tickets from being illegally drawn out, said lottery ticket machine comprising:

a machine base provided with two side plates respectively bored with threaded holes, one of said two side plates having an outer side secured thereon with pivots, said machine base disposed with a lottery ticket circular passageway in an interior thereof, said lottery ticket circular passageway having an outer end formed with a ticket outlet;

a driving device positioned in said machine base, said driving device composed of a motor, a driving gear and a driven gear;

two press rollers fixed inside said machine base, said lottery ticket circular passageway having a part near said ticket outlet extended forward between said two press rollers, letting opposite sides of a lottery ticket rolled and pressed by said two press rollers; and characterized by one of said two press rollers secured thereon with a shaft, said shaft extending out of said machine base in same direction of said pivots, said shaft having outer side disposed with a combining member and an engage groove; and a control device fitted on said shaft of said press roller, said control device consisting of a rotary gear, a bushing, a control wheel, a spring, a bushing cover, a retainer and an outer cover, said rotary gear fitted on said shaft of said press roller and driven to rotate by said driven gear of said driving device, said rotary gear bored with more than one engage hole, said bushing fitted on said combining member of said shaft of said press roller, said bushing having its outer side fixed thereon with more than one projecting ridge, said control wheel fitted on said bushing, said control wheel bored with a bushing hole, said control wheel having an outer side annularly disposed with plural engage teeth, said spring received in an inner circumference of said engage teeth of said control wheel, said control wheel having rear side fixed with more than one projecting member to be correspondingly engaged with said engage holes of said rotary gear, said bushing cover fitted on said bushing, said bushing cover bored in the center with a bushing hole with a shape matching with that of said bushing, said spring having another end pushing against an inner wall of said bushing cover, said retainer clasped in said engage groove at an outer end of said shaft of said press roller so as to firmly position said control device on said shaft of said press roller, said outer cover threadably combined with said side plate of said machine base for covering both said driving device and said control device, said outer cover disposed with a recess in an interior thereof, a plurality of engage teeth being fixed in an inside of said recess and being correspondingly engaged with said engage teeth of said control wheel; and wherein said bushing hole of said control wheel of said control device has inner wall provided with more than one slide groove for engaging said projecting ridges of said bushing.

2. The lottery ticket machine able to prevent tickets from being illegally drawn out as claimed in claim 1, wherein said motor of said driving device is provided with a gear shaft extending out of said machine base, and said driving gear is pivotally assembled with said pivot of said machine base and engaged with said gear shaft of said motor, said driving gear having rear side fixed with a driving pinion, said driven gear pivotally set with said pivot of said machine base and engaged with said driving pinion of said driving gear, said driven gear having a front side fixed with a driven pinion.

3. The lottery ticket machine able to prevent tickets from being illegally drawn out as claimed in claim 1, wherein said rotary gear of said control device is bored with a shaft hole in a center, and each said engage hole of said rotary gear has an inner wall disposed with a slope at one side along a circumferential direction and formed with an arcuate surface at another side.

4. The lottery ticket machine able to prevent tickets from being illegally drawn out as claimed in claim 1, wherein said bushing of said control device is bored with a through hole with a same shape as said combining member of said shaft.

5. The lottery ticket machine able to prevent tickets from being illegally drawn out as claimed in claim 1, wherein each said engage tooth of said control wheel has one side formed with an engage surface and another side disposed with a slope, and said bushing hole of said control wheel has an outer circumference bored with a spring groove.

6. The lottery ticket machine able to prevent tickets from being illegally drawn out as claimed in claim 1, wherein said projecting member of said control wheel has one side formed with a slope and another side provided with an arcuate surface.

7. The lottery ticket machine able to prevent tickets from being illegally drawn out as claimed in claim 1, wherein a gasket is fixed at a front side of said bushing cover of said control device.

8. The lottery ticket machine able to prevent tickets from being illegally drawn out as claimed in claim 1, wherein said outer cover of said control device is bored with plural threaded holes.

9. The lottery ticket machine able to prevent tickets from being illegally drawn out as claimed in claim 1, wherein each said engage tooth inside said outer cover has one side formed with an engage surface and another side disposed with a slope.

* * * * *